United States Patent
Soffientini et al.

(10) Patent No.: US 11,291,218 B2
(45) Date of Patent: Apr. 5, 2022

(54) MACHINE FOR THE PRODUCTION OF LIQUID, SEMI-LIQUID OR PASTY SOLID FOOD PRODUCTS EQUIPPED WITH AUTOMATIC WASHING SYSTEM AND METHOD FOR CLEANING SUCH A MACHINE

(71) Applicant: FRIGOMAT S.r.l., Milan (IT)

(72) Inventors: Paolo Soffientini, Guardamiglio (IT); Emanuela Cipelletti, Guardamiglio (IT)

(73) Assignee: FRIGOMAT S.R.L., Milan (IT)

( * ) Notice: Subject to any disclaimer, the term of this patent is extended or adjusted under 35 U.S.C. 154(b) by 0 days.

(21) Appl. No.: 17/135,482

(22) Filed: Dec. 28, 2020

(65) Prior Publication Data
US 2021/0212339 A1 Jul. 15, 2021

(30) Foreign Application Priority Data

Jan. 10, 2020 (EP) .................................... 20425001

(51) Int. Cl.
*A23G 9/30* (2006.01)
*A23G 9/22* (2006.01)
(52) U.S. Cl.
CPC .............. *A23G 9/30* (2013.01); *A23G 9/228* (2013.01)
(58) Field of Classification Search
CPC . A23G 9/30; A23G 9/228; A23G 9/12; A23G 9/281; B08B 9/057
See application file for complete search history.

(56) References Cited

U.S. PATENT DOCUMENTS

| | | | |
|---|---|---|---|
| 2,936,992 A | 5/1960 | Browning | |
| 4,465,210 A * | 8/1984 | Iwanami | G07F 13/06 222/148 |
| 4,848,381 A * | 7/1989 | Livingston | A23G 7/00 134/57 R |
| 5,855,295 A * | 1/1999 | Lee | G07F 13/00 222/1 |
| 6,287,515 B1 * | 9/2001 | Koosman | A61L 2/183 422/186.07 |

(Continued)

FOREIGN PATENT DOCUMENTS

| | | |
|---|---|---|
| EP | 3195733 A1 | 7/2017 |
| IT | UB20155289 A1 | 4/2017 |

OTHER PUBLICATIONS

European Search Report for European Application No. 20425001.3 (4 Pages) (dated Jun. 24, 2020).

*Primary Examiner* — Emmanuel E Duke
(74) *Attorney, Agent, or Firm* — Lucas & Mercanti, LLP

(57) ABSTRACT

A machine for the production of liquid, semi-liquid or pasty solid food products is described. The machine includes a working container provided with an internal stirrer and externally with heat exchange means, an inlet opening in fluid communication with means for feeding a base food mixture into the container, a first outlet opening for a finished food product and a second outlet opening or a washing liquid. The machine further includes an automatic device for washing the feeding means and the container, and the automatic device has a circuit and a pump for recirculating the washing liquid and means for heating the recirculated washing liquid. A method for cleaning a machine of the aforementioned type is also described.

19 Claims, 3 Drawing Sheets

(56) References Cited

U.S. PATENT DOCUMENTS

| | | |
|---|---|---|
| 6,494,055 B1 | 12/2002 | Meserole et al. |
| 10,251,410 B2 | 4/2019 | Cocchi et al. |
| 2004/0118291 A1* | 6/2004 | Carhuff .................... A61L 2/08 99/275 |
| 2005/0269362 A1 | 12/2005 | Guerrero et al. |
| 2013/0140328 A1* | 6/2013 | Gates ........................ B08B 9/02 222/148 |
| 2014/0109770 A1* | 4/2014 | Kolar .................... A47J 31/402 99/275 |
| 2016/0037963 A1* | 2/2016 | Tuchrelo ............... B08B 9/0328 222/148 |
| 2017/0347682 A1* | 12/2017 | Dong ................... B08B 9/0325 |

\* cited by examiner

MACHINE FOR THE PRODUCTION OF LIQUID, SEMI-LIQUID OR PASTY SOLID FOOD PRODUCTS EQUIPPED WITH AUTOMATIC WASHING SYSTEM AND METHOD FOR CLEANING SUCH A MACHINE

CROSS-REFERENCE TO RELATED APPLICATIONS

This application claims the benefit of priority from European patent application No. 20425001.3 filed Jan. 10, 2020, the contents of which are incorporated herein by reference.

FIELD OF THE INVENTION

The present invention relates to a machine for the production of liquid, semi-liquid or pasty solid food products, such as in particular ice creams or similar cold food products.

In particular, the present invention relates to a machine of the aforementioned type provided with a system for the automatic washing of the components which come into contact with the base mixture or with the finished food product.

The present invention also relates to a method for cleaning a machine of the aforementioned type by means of an automatic washing system.

BACKGROUND OF THE INVENTION

As is known, machines for the production of liquid, semi-liquid or pasty solid food products such as ice creams and the like comprise a batch freezer device comprising a cylindrical container provided internally with a stirrer and externally with heat treatment means. A base food product mixture is fed and worked inside the cylindrical container so as to be converted into a finished product, for example an ice cream.

A requirement of the machines of the aforementioned type is that the components which come into contact with the base mixture or with the finished product must be periodically cleaned in order to reduce the risk of bacterial load forming and increase the safety of the final product prepared. Said cleaning is also necessary during the change-over between one working cycle and a following cycle where it is required to process a base mixture different from the one used in the previous working cycle.

In this connection the parts of the circuit for supplying the machine which are located near to or in contact with the external environment as well as the container for working the base mixture of the batch freezer device, are of particularly critical importance.

In order to satisfy the aforementioned requirement, different systems and methods for cleaning the machines of the aforementioned type are known, these involving washing and optionally sanitization and/or sterilization operations using liquids containing special bactericidal substances.

However, these operations are frequently long and laborious because they are often performed manually and may require the disassembly of certain component parts of the machine which cannot always be easily accessed, or which may have a complex structure.

This results in the need to stop the machine for relatively long periods of time with a consequent loss of productivity.

The main object of the present invention is to provide a machine for the production of liquid, semi-liquid or pasty solid food products, such as in particular ice creams or similar cold food products, which has an efficient system for washing in particular the components which come into contact with the base food mixture or with the finished product, so as to ensure that the final finished product is safe for consumption and reduce as far as possible the machine downtime.

Another object of the present invention is to provide a machine as described above which is able to reduce to a minimum the disassembly of components of the machine which must be cleaned and/or to reduce the quantity of cleaning liquids used.

A further object of the present invention is to provide a machine as described above which is simple from a constructional point of view in that it does not give rise to complications and/or constructional problems, such that it may be mass-produced at a low cost.

A further object of the present invention is to provide a machine having the aforementioned characteristics, which is easy and practical to use for professional operators, for example for those working in an artisanal ice cream parlour.

Another object of the present invention is to provide a method for cleaning a machine for the production of liquid, semi-liquid or pasty solid products, such as in particular ice creams or similar cold food products, which is able to satisfy the aforementioned requirements.

SUMMARY OF THE INVENTION

These objects are achieved primarily by a machine for the production of liquid, semi-liquid or pasty solid food products, such as in particular ice creams or similar cold food products, said machine comprising a working container provided with an internal stirrer, an inlet opening in fluid communication with means for feeding a base food mixture into said container, a first outlet opening for a finished food product and a second outlet opening for a washing liquid, heat exchange means arranged on the outside of said container and able to exchange heat with said container and a washing device, characterized in that the washing device comprises:

- at least one washing liquid inlet pipe in fluid communication with said means for feeding the base mixture into said container;
- at least one washing liquid discharge pipe connected to said second opening of the container and in fluid communication with the outside of the machine;
- a discharge valve in fluid communication with said second opening of the container and said at least one discharge pipe;
- a washing liquid recirculation circuit comprising a recirculation pipe connected to said at least one inlet pipe and to said at least one discharge pipe and a recirculating pump in fluid communication with said at least one recirculation pipe;
- a command and control unit in two-way electrical communication with at least said discharge valve and said recirculating pump and comprising timing means, said command and control unit being able to close said discharge valve and keep in the stopped position or stop said recirculating pump for a first predetermined time period during which said container is subjected to a first washing cycle, and being able to open said discharge valve and to switch said recirculating pump into an operating position for a second predetermined time period during which said feeding means and said container are subjected to a second washing cycle by means of recirculation of a washing liquid inside said recirculation circuit.

In a preferred embodiment, the washing liquid recirculation circuit also comprises means for heating the washing liquid which are associated with said recirculation pipe and in electrical communication with said command and control unit, said heating means being operated and/or adjusted by said command and control unit during said second predetermined washing time period until a predetermined temperature is reached and/or so as to maintain said temperature.

The aforementioned objects are also achieved by a method for cleaning a machine of the aforementioned type.

This cleaning method comprises the steps of:

a) subjecting the working container to a first washing cycle with a first quantity of washing liquid for a first predetermined time period while keeping closed the discharge valve associated with the second outlet opening of said working container;
b) opening said discharge valve and discharging the washing liquid;
c) optionally subjecting the means for feeding the base mixture and the working container to a second washing cycle using a second quantity of washing liquid for a second predetermined time period while keeping said discharge valve open, said washing liquid being circulated inside said recirculation circuit by means of said recirculating pump;
d) stopping said recirculating pump and discharging the washing liquid; and
e) optionally repeating the preceding steps a) and b) and/or the steps c) and d) depending on number of additional washing cycles required.

In an embodiment of the cleaning method according to the invention, during step c) the washing liquid is heated by the heating means to a predetermined temperature and/or kept at this temperature. Preferably the heating temperature of the washing liquid is between 60° C. and 85° C.

Preferably, the washing liquid comprises or consists of water, in particular mains water.

In an embodiment, the first washing cycle according to step a) comprises the step of supplying said first quantity of washing liquid into said means for feeding the base mixture and into said container by means of said at least one washing liquid inlet pipe.

In an embodiment, the first washing cycle according to step a) comprises the step of distributing the washing liquid supplied in said means for feeding the base mixture.

In an embodiment, the second washing cycle according to step a) comprises the step of supplying said second quantity of washing liquid into said means for feeding the base mixture, into said container and into said at least one discharge pipe by means of said at least one washing liquid inlet pipe.

In an embodiment of the cleaning method according to the invention, the stirrer of the container is activated during the first washing cycle according to step a) and/or during the second washing cycle according to step c).

In an embodiment of the cleaning method according to the invention, the first washing cycle according to step a) and/or the second washing cycle according to step c) comprise(s) the step of supplying a detergent into the washing liquid.

In an embodiment of the cleaning method according to the invention, the second washing cycle according to step c) comprises the step of supplying a rinse aid into the washing liquid.

In an embodiment, the cleaning method according to the invention also comprises, after the washing liquid discharge step d) or after the step e), where provided, the step of disassembling and cleaning the discharge valve.

In the cleaning method according to the invention, the first quantity of washing liquid and the second quantity of washing liquid may range between 2 liters and 16 liters. Preferably, the second quantity of washing liquid is greater than the first quantity of washing liquid. Moreover, the time for execution of the first washing cycle and the second washing cycle may be between 1 minute and 5 minutes.

Further characteristic features and advantages of the present invention will emerge more clearly from the detailed description provided hereinbelow of a preferred, but not exclusive embodiment, with reference to the attached figures, provided by way of a non-limiting example.

DETAILED DESCRIPTION OF THE INVENTION

Figure 1:
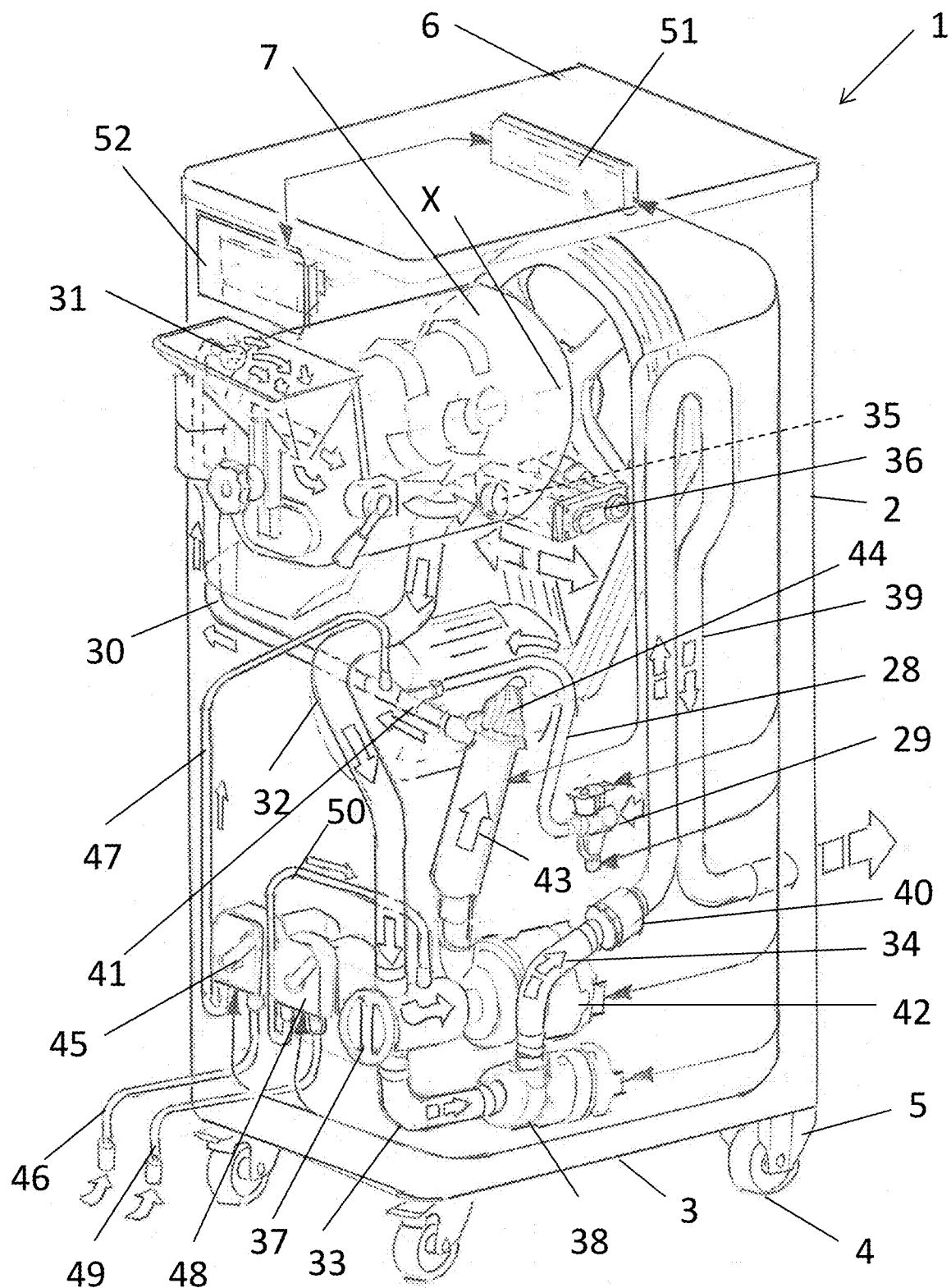
FIG. 1 shows a perspective cut-away view of a machine for the production of ice creams or similar cold food products according to the present invention.
Figure 2:
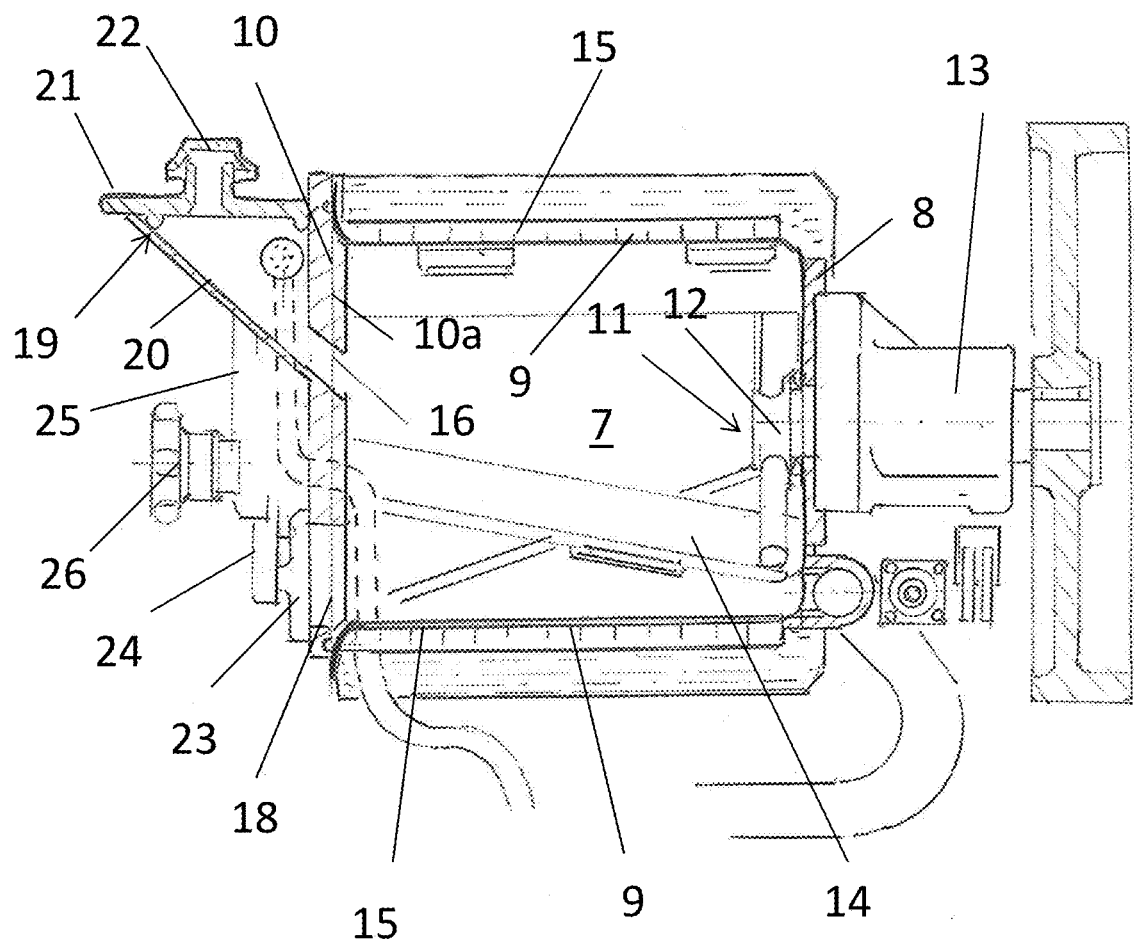
FIG. 2 shows a cross-sectional view of the working container of the machine according to FIG. 1.
Figure 3:
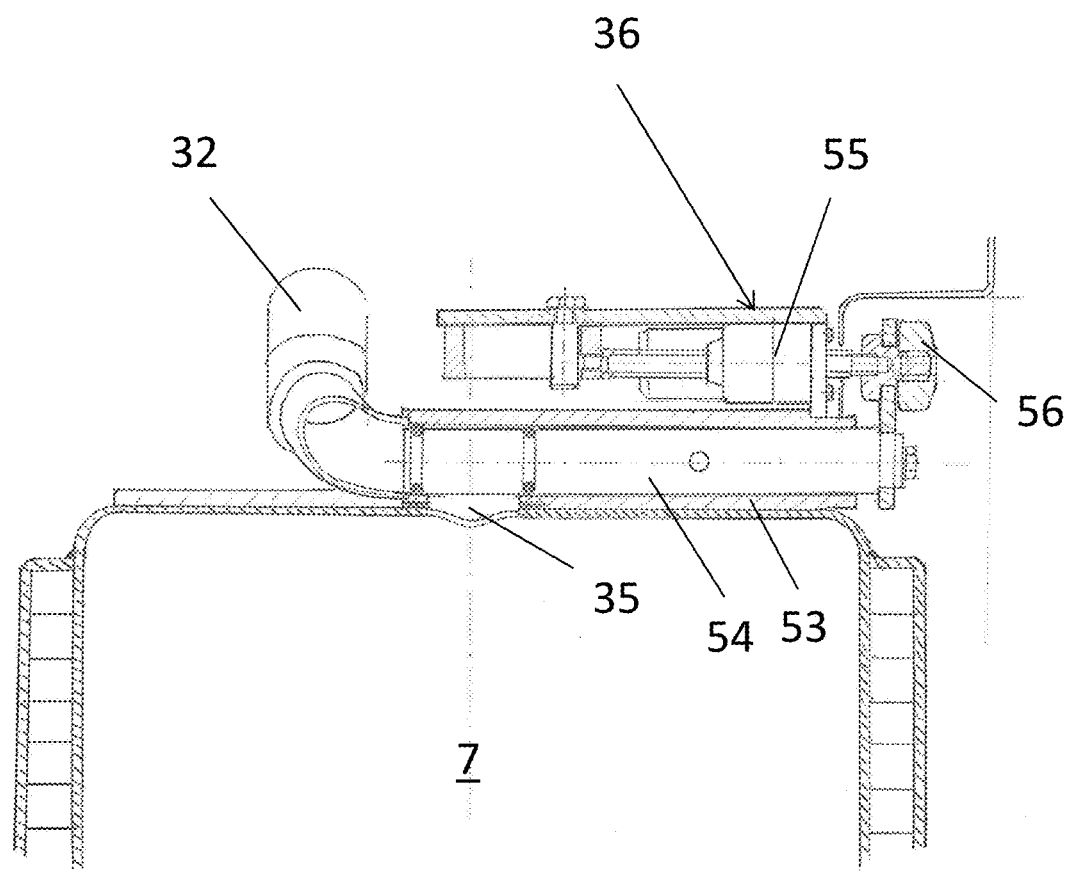
FIG. 3 shows a cross-sectional view of a detail relating to the working container and to the discharge valve of the machine according to FIG. 1.

With reference to the aforementioned figures, a machine for the production of ice creams and similar cold food products (for example granitas, sorbets, etc.) is denoted overall by 1.

The machine 1 comprises a frame 2 provided at the bottom with a base 3, underneath which roller wheels 4 are fixed by means of respective brackets 5, and at the top with a flat surface 6.

The machine 1 also comprises internally a batch freezer or mixer comprising a cylindrical container 7 for containing and working a base mixture for ice cream, the container extending horizontally, namely along a horizontal axis X transverse to the (vertical) axis of longitudinal extension of the machine 1.

More particularly, the container 7 has an end wall 8, side walls 9 and an access opening situated on one side of the machine 1 and able to be closed by means of a hatch 10 hinged with the frame 2 of the machine. A stirrer 11 coaxial with the longitudinal axis X of the container 7 and comprising a central shaft 12 rotationally driven in a manner known per se by an electric motor 13 (not shown) is arranged inside the container 7. The stirrer 11 has, extending radially therefrom, at least one scraping blade 14 on which a respective skid (or knife) having the same form as the scraping blade is mounted. The blades 14 have suitable dimensions such as to allow, during rotation of the shaft 12, adequate mixing/whipping of the base food mixture introduced into the container 7 and scraping of the wall 9 of the container 7.

The machine 1 also has heat exchange means 15 arranged on the outside and around the container 7 so as to exchange heat therewith (in particular to cool the container 7). These means are conventional per se and may comprise for example a coil 15 arranged on the outside of the container 7 around the side walls 9 thereof and intended to be passed through by a cooling fluid circulating inside a special circuit of a refrigerating system (not shown), conventional per se, arranged inside the frame 2 of the machine 1.

The machine 1 also comprises means for feeding a base food mixture into the container 7 communicating with an inlet opening 16 of the container 7 and a first outlet opening 18 for a finished food product.

In the present non-limiting embodiment, the aforementioned feeding means comprise a hopper 19 formed integrally on the outer side of the closing hatch 10 of the container 7 and delimited by an upper portion 10a of the vertical wall of the hatch 10 and by a wall 20 which projects from the hatch 10 obliquely outwards and upwards.

At the bottom end of the hopper 19 the hatch 10 has, formed therein, the inlet opening so as to connect the hopper 19 to the container 7 and allow feeding of the base food mixture therein. At the top end of the hopper there is instead present a closing lid 21, for example made of plastic transparent material, provided with a vent 22.

The first outlet opening 18 is also formed in the hatch 10 in a bottom end zone thereof. This first outlet opening 18 has, associated with it, an opening and closing lid 23 fixed to a plate 24 slidable vertically between guides 25 and provided with a mechanism for adjusting and fixing the position by means of the manual operation of a clamping control knob 26. In particular, this fixing and adjustment mechanism may comprise a threaded pin (not shown) integrally formed in a top end zone, in use, of the plate 24 and projecting from the guides 25, a perforated locating plate (not shown) mounted by means of the respective hole (not shown) on the threaded pin and kept resiliently tensioned by means of a spring (not shown) with respect to the guides 25, and the aforementioned control knob 26 screwed onto the threaded pin. The vertical sliding of the plate 24 between the guides 25 may be performed by unscrewing the control knob 26 so as to allow expansion of the spring by the amount needed to disengage the locating plate from its position pressing against the guides 25 and then, by again operating the control knob 26, so as to cause vertical sliding (downwards or upwards) of the plate 24 between the guides 25. Sliding of the plate 24 also causes sliding of the opening and closing lid 23 integral therewith. In particular, this lid 23 may slide vertically between a lowered position for closing the first outlet opening 18 and a raised position for opening the outlet opening 18 where the lid 23 is located at least partially above this opening 18 so as to allow the finished food product to exit the container 7. This finished product may be recovered inside an outside container resting for example on a special support of the machine 1. When the desired vertical position is reached, the operator may advantageously fix the position of the opening and closing lid 23 by screwing tight the control knob 26 on the threaded pin so as to compress the spring and bring the locating plate to abut with pressure against an outer wall of the guides 25.

In accordance with the present invention, the machine 1 also comprises a device for automatically washing the machine feeding circuit and the working container 7.

This automatic washing device comprises a first inlet pipe 28 for a washing liquid (for example water) terminating at one end connected to the outside of the machine 1 by an electric valve 29 and a second inlet pipe 30 connected at one end to the first inlet pipe 28 and connected at the opposite end to the hopper 19 so as to be in fluid communication with the inside thereof.

The first inlet pipe 28 may be connected to a supply of washing liquid (for example water), in particular to the water mains, and the electric valve 29 advantageously allows the introduction, into the washing circuit of the machine 1, of a predetermined quantity of the washing liquid (for example water) needed for the different stages of the cleaning cycle, as will be illustrated further below in the present description.

The hopper 19 has, at the connection with the second inlet pipe 30, means for distributing the flow of the washing liquid introduced into the washing circuit inside the hopper 19.

In the present embodiment, these distribution means consist of a spray ball 31 by means of which the washing liquid (for example mains water) may be advantageously distributed via high-pressure jets which are able to clean effectively the surfaces coming into contact with the food both during the loading (feeding) steps and during the working steps.

The automatic washing device also comprises a first discharge pipe 32, a second discharge pipe 33 and a third discharge pipe 34 which are connected in series along the direction of flow of the washing liquid.

The first discharge pipe 32 is connected, at one end, to a second outlet opening 35 formed on the bottom 8 of the container 7, and a discharge valve 36 is arranged in fluid communication between the first discharge pipe 32 and the second outlet opening 35.

More particularly, the discharge valve 36 comprises a tubular section 53 connected at one end to the first discharge pipe 32 and fixed laterally in a fluid-tight manner onto the outer side of the bottom 8 of the container 7, and a plunger 54 sliding in a fluid-tight manner inside the tubular section 53 and connected to an actuating device 55. The tubular section 53 extends a direction transverse to the longitudinal axis X of the container 7 and the stirrer 11 and has laterally an opening at the second outlet opening 35. In particular, the plunger 54 is movable between an end stop position of opening of the second outlet opening 35 so as to place the container 7 in fluid communication with the first discharge pipe 32 and an end stop position of closing of the second discharge opening 35.

The actuating device 55 may be for example an electric actuator which may be equipped with an end stop relay for controlling the position of the plunger 54 and adjusting the opening and closing run thereof.

It should be noted that the plunger 54 is movable transversely with respect to the horizontal axis X of the working container and this advantageously prevents interference between the discharge valve 36 and the stirrer 11 also in the case of malfunctioning of the machine 1.

The discharge valve 36 is arranged advantageously in a position of the machine such as to be able to be easily accessed by an operator and is designed so that it may be easily disassembled by the operator for example for manual cleaning operations. In this connection, the plunger 54 may be fixed to the remaining structure of the valve 36 by means of a knob 56, removal of which allows total extraction of the plunger 54 from its seat.

In the machine 1, the second loading pipe 33 is connected at one of its ends to the first pipe 32 via a filter 37 which is arranged between them and, at its opposite end, it is connected to one end of the third discharge pipe 34 via a discharge pump arranged in between them. The third discharge pipe 34 comprises a siphon 39 and communicates with the outside of the machine so as to be able to be connected to a discharge container or to the sewage system of the premises where the machine 1 is installed.

A valve 40 may be provided on the third discharge pipe 34 for preventing automatic activation of discharging due to a negative pressure (lack of air) at the discharging location (for example sewage system).

In accordance with an aspect of the present invention, the device for washing the machine 1 also comprises a recirculation circuit comprising the second inlet pipe 30, the first discharge pipe 32 and a recirculation pipe 41 connected to the second inlet pipe 30, substantially near to the zone where the latter is connected to the first inlet pipe 28, and connected to the first discharge pipe 32 in the region of the filter 37. This recirculation circuit also comprises a recirculating pump 42 arranged in fluid communication with the filter 37 and a heater 43 arranged at the recirculation pipe 41. This heater 43 is provided with at least one heating element, for example an electric resistance, present inside the recirculation pipe 41 so as to intercept and heat the flow of washing liquid passing through the pipe 41. The heater 43 may be provided with a temperature probe 44, for example an electronic probe, arranged close to the outlet of the heater 43 (with reference to the direction of flow of the washing fluid in the recirculation circuit) so as to detect the temperature of the washing fluid circulating in the recirculation circuit at the outlet of the heater 43.

The machine 1 may also be provided with a device for injecting a detergent (for example bactericide) into the washing liquid so as to perform, in addition to washing, also sanitization or sterilization of the machine components which come into contact with the food loaded and processed inside it.

In the present embodiment, this device comprises a pump 45 connected to a pipe 46 for drawing off the detergent from a respective storage vessel and connected to a pipe 47 for introducing the detergent into the washing circuit downstream of the heater 43 (with reference to the direction of flow of the washing liquid). In particular, the pipe 47 for introducing the detergent into the washing circuit is connected to the second pipe 30 for introducing the washing liquid into the machine 1.

The machine 1 may also be provided with a device for injecting a rinse aid into the washing liquid.

In the present embodiment, this device comprises a pump 48 connected to a pipe 49 for drawing off the rinse aid from a respective storage vessel and connected to a pipe 50 for introducing the rinse aid into the washing circuit, downstream of the filter 37. In particular, the pipe 50 for introducing the rinse aid is connected to the pipe 41 for recirculating the washing fluid upstream of the heater 43.

The machine 1 also comprises a command and control unit 51 (for example an electronic control unit) connected via a two-way electrical connection to an external display 52 for interfacing with the operator, provided with physical and/or virtual (touch) control keys. By means of the control keys of the display 52 the operator may switch on and/or off the machine and may activate the various machine working and washing operations by setting predefined or personalized programs with the corresponding parameters such as in particular the parameters relating to the time, temperature (in particular of the washing liquid) and stirring speed of the stirrer 11.

The command and control unit 51 is also connected via a two-way electrical connection to other operating components of the machine, as indicated by the arrows in FIG. 1. In particular, the command and control unit 51 is connected at least to the discharge valve 36 (in particular to its actuating device 55), to the stirrer 11 and to the associated motor 13, to the electric valve 29, to the heater 43 and to the pumps 38, 42, 45 and 48.

With regard to operation of the machine 1, during the feeding and working steps, the base food products are fed separately or in a mixture into the hopper 19, after raising of the respective lid 21, and from here pass down into the batch freezer (or mixing) container 7 through the inlet opening 16.

The base mixture fed or resulting from the mixing of the base food products is then worked inside the container 7 by means of the stirrer 11, while the container is kept at a predefined temperature (for example a refrigerating temperature) by means of the heat exchange fluid which passes through the coil 15. The working parameters, such as the time, stirring speed of the stirrer 11 and temperature, may be set by the operator depending on a program preselected via the keys of the display 52.

At the end of the working treatment, the finished food product is unloaded from the batch freezer container 7 through the first outlet opening 18 of the machine. In this case, the operator may unscrew the control knob 26 by the amount needed to allow sliding of the plate 24 between the guides 25 and raising of the plate 24 until the lid 23 integral with it is situated above the first outlet opening 18 so as to allow the expulsion of the finished food product from the container 7. This product may be collected in a container arranged underneath the first outlet opening 18 and resting on a suitable support of the machine 1.

At the end of one or more working cycles and/or before the start of a new working cycle, the machine 1 may undergo washing, and optionally sanitization and/or sterilization, of the components which have come into contact with the base mixture and/or with the finished food product, particularly the feeding hopper 19 and the batch freezer container 7.

In accordance with the present invention, the washing operations are performed automatically by means of a cleaning method which comprises the steps described hereinbelow.

During a first step, a predetermined quantity of washing liquid, in particular mains water (hot or cold) is introduced into the washing circuit by means of the electric valve 29 which may be provided for this purpose with a litre counter. The washing water is conveyed along the first inlet pipe 28 and the second inlet pipe 30 as far as the hopper 19 and is introduced into it via the distribution device 31, for example a spray ball, which advantageously allows the washing water to be distributed in the hopper 19 by means of high-pressure jets able to clean effectively the surfaces coming into contact with the foodstuff during both the loading and the working stages.

The washing water introduced into the hopper 19 flows naturally (i.e., by means of gravity) into the working container 7 via the inlet opening 16 until this working container is at least partially filled. During this step, the second outlet opening 35 is closed by the discharge valve 36 which is operated and controlled by the control unit 51 so as to assume and/or maintain its closed position.

This is then followed by a first washing cycle for a first predetermined time period depending on the desired program (for example a time period of between 1 minute and 5 minutes) where the container 7 is washed with the water introduced into it while keeping at the same time the discharge valve 36 in the closed position. During this step, it may be advantageously envisaged activating the stirrer 11 by means of the control unit 51, which stirrer 11 may be made to rotate both in the clockwise direction and in the anti-clockwise direction for predefined time periods so as to generate an effective turbulence and cause rinsing of the surfaces and any food product residue still present in the working container.

At the end of the first washing cycle, the discharge valve 36 is opened by means of the control unit 31, thus allowing the washing water to be discharged from the working container 7 through the second outlet opening 35.

The washing water discharged from the working container 7 is introduced into the first discharge pipe 32 where it reaches the filter 37 which advantageously allows the solid residue of the working operation (for example particles, pieces of nuts, etc.) which may be contained in the washing water to be separated and retained. The filter 37 is conventionally positioned on the machine 11 so that the operator may frequently access it in order to perform the routine cleaning operations.

The washing water output from the filter 37 is then conveyed into the second discharge pipe 33 and, by means of the discharge pump 38 which during this step is activated and/or controlled by the control unit 51 so as to be operative, it is conveyed into the third discharge pipe 34 where, via the siphon 39, it is disposed off outside the machine 1, for example into the sewage system of the installation premises, to which the machine 1 is connected.

The valve 40, if present on the third discharge line 34, prevents the automatic activation of discharging due to the lack of air inside the sewage system itself.

At the end of this first washing cycle using mains water can follow a second cycle for washing the components of the machine 1 which have come into contact with the base mixture and/or the finished food product.

In accordance with the present invention, during a first phase of the second washing cycle, a second predetermined quantity of washing liquid, in particular mains water (hot or cold), is introduced into the washing circuit by means of the electric valve 29 which may be provided for this purpose with a litre counter. The second quantity of washing liquid is preferably greater than the first quantity of washing liquid used for the first washing cycle.

During this step, the discharge valve 36 is operated and controlled by the control unit 51 so as to assume and maintain its open position, thus placing the working container 7 in fluid communication with the first discharge pipe 32 via the second outlet opening 35. At the same time, the discharge pump 38 is operated and controlled by the control unit 51 so as to be stopped and/or kept in a stopped state.

Therefore, the washing water introduced into the washing circuit via the electric valve 29 is conveyed along the first inlet pipe 28 and the second inlet pipe 30 as far as the hopper 19 and is introduced into it via the distribution device 31, for example a spray ball.

The washing water introduced into the hopper 19 then flows into the working container 7 via the inlet opening 16 and from here flows down partly, via the second outlet opening 35 also into the first discharge pipe 32 and into the filter 37 up to fill them. Since the discharge pump 38 is kept in a stopped state, the washing water is prevented from being discharged towards the outside of the machine 1 via the third discharge pipe 34.

At this point, the recirculating pump 42 is operated and controlled by the control unit 51 so as to assume and maintain an operating condition thereby allowing the washing water to be circulated in the recirculation circuit, namely inside the recirculation pipe 41, second inlet pipe 30, hopper 19, container 7 and first discharge pipe 32 following the direction of flow indicated by the arrows in FIG. 1.

At the same time, the washing water circulating in the recirculation circuit is heated to a predetermined temperature, for example between 60° C. and 85° C., by passing through the heater 43 suitably activated and controlled by the control unit 51. The heating temperature of the washing water may be suitably set by the operator depending on the desired program and controlled by means of the probe 44 associated with the heater 43. The probe 44 communicates with the control unit 51 which adjusts operation of the heater 43 depending on the temperatures recorded by the probe 44 during the washing cycle and transmitted to the control unit 51.

The washing water heated by the heater 43 is circulated substantially for the entire duration of the second washing cycle, which may be predefined by the operator depending the desired program. During the second washing cycle, the stirrer 11 of the container 7 may conveniently remain at a standstill or may be activated by the control unit 51 so as to alternate rotation in the clockwise direction and anti-clockwise direction.

At the end of the second washing cycle, the control unit 51 stops operation of the recirculating pump 42 and the heater 43 and operates the discharge pump 38 so as to allow discharging of the washing water outside the machine 1, which passes along the second discharge pipe 33 and the third discharge pipe 34, until the water in the washing circuit has been completely removed. In this connection, the presence of any residual water in the washing circuit may be advantageously detected by a sensor device (not shown), for example of the electrically conducting type, which is conveniently arranged at the outlet of the heater 43 and communicates with the control unit 51.

The first washing cycle and the second washing cycle are suitably managed automatically by the control unit 51 which communicates with the operator via the display board 52. In particular, the operator may select different automatic washing cycles in the manner indicated above for the first washing cycle and/or for the second washing cycle, with personalization of the times, temperatures and stirring action.

It should also be noted that, during execution of the first washing cycle and/or second washing cycle, sanitizing or sterilizing detergent may be injected into the washing circuit of the machine 1. Similarly, a rinse aid may be injected into the washing circuit during execution of the second washing cycle.

In this connection, in the case of injection of sanitizing or sterilizing detergent, during supplying of the washing water in order to perform the first washing cycle or the second washing cycle, the control unit 51 operates the pump 45 as well as the electric valve 29. In this way, by means of the pump 45, the detergent drawn off from an appropriate storage vessel via the draw-off pipe 46 is conveyed into the detergent inlet pipe 47 and from here flows into the second washing water inlet pipe where the detergent is mixed with the water supplied in the washing circuit via the electric valve 29.

Similarly, in the case of injection of a rinse aid during the execution of the second washing cycle, the control unit 51 activates the pump 48. In this way, the rinse aid which has been drawn off from an appropriate storage vessel via the draw-off pipe 49 is conveyed into the rinse aid inlet pipe 50 and from here flows into the recirculation pipe 41 where the rinse aid is mixed with the water circulating in the recirculating circuit of the machine 1.

In the light of the above, the machine for the production of liquid, semi-liquid or pasty solid food products, such as in particular ice creams or similar cold food products, and the method for cleaning said machine according to the invention achieve the predefined objects and allow various advantages to be achieved compared to the prior art.

In fact, owing to the use of an automatic washing device as described above, with the machine according to the invention it is possible to wash efficiently the components which come into contact with the base food mixture or with the finished product (in particular the hopper and the working container) thereby ensuring that the final finished product is safe for consumption and, at the same time, reducing the machine downtime.

Moreover, with the machine according to the invention it is possible to reduce to a minimum the disassembly of machine components which must be cleaned, this being limited in particular to the discharge valve associated with the working container and/or the filter, thus helping reduce further the machine downtime. In this connection, it should be noted that the aforementioned components to be disassembled for cleaning are arranged advantageously in positions on the machine which may be easily accessed from the outside by an operator and can be easily disassembled.

Another advantage of the machine according to the invention consists in the possibility of reducing the overall quantity of the washing liquid introduced into the machine for the cleaning operations owing to the use of a recirculation circuit by means of which the washing liquid is circulated several times inside the machine and preferably heated so as to increase the washing efficiency.

It should also be noted that the machine according to the invention has a simple constructional design and is therefore suitable for mass-production at a low cost. In this connection, any additional costs arising for example from the use of the recirculating circuit for washing liquid are widely offset by the aforementioned significant functional, operational and cost-related advantages which can be achieved with the machine according to the invention.

It should also be noted that the machine according to the invention is easy and practical to use for the professional operator.

The machine for the production of liquid or semi-liquid products, such as in particular ice creams or similar cold food products, and the method for cleaning said machine as described above may be subject to numerous modifications and variations carried out by a person skilled in the art, for example in order to satisfy specific requirements which may arise, all of these being moreover included in the scope of protection of invention, as defined by the following claims.

The invention claimed is:

1. A machine for the production of liquid, semi-liquid or pasty solid food products, such as in particular ice creams or similar cold food products, comprising a working container provided with an internal stirrer, an inlet opening in fluid communication with means for feeding a base food mixture into said container, a first outlet opening for a finished food product and a second outlet opening for a washing liquid, the machine further comprising heat exchange means arranged on the outside of the container and able to exchange heat with the container, and a washing device, wherein the washing device comprises:
   a washing liquid inlet pipe in fluid communication with the means for feeding the base mixture into the container;
   a washing liquid discharge pipe connected to the second outlet opening of the container and in fluid communication with the outside of the machine;
   a discharge valve in fluid communication with the second outlet opening of the container and the discharge opening;
   a circuit for recirculating the washing liquid comprising a recirculation pipe connected to the inlet pipe and to the discharge pipe, and a recirculating pump in fluid communication with the recirculation pipe, and
   a command and control unit in two-way electrical communication with the discharge valve and the recirculating pump, wherein the command and control unit is able to close the discharge valve and keep in the stopped position or stop the recirculating pump for a first predetermined time period during which the container is subjected to a first washing cycle, and is able to open the discharge valve and switch the recirculating pump into an operating position for a second predetermined time period during which the feeding means and the container are subjected to a second washing cycle by means of recirculation of a washing liquid inside said recirculation circuit.

2. The machine of claim 1, wherein the washing liquid recirculation circuit further comprises means for heating the washing liquid, associated with the recirculation pipe and in electrical communication with the command-and-control unit, wherein the heating means is operated and/or adjusted by the command-and-control unit during the second predetermined washing time period until a predetermined temperature is reached and/or so as to maintain said temperature.

3. The machine of claim 1, further comprising means for distributing the washing liquid flow, arranged inside the means for feeding the base mixture and in fluid communication with the washing liquid inlet pipe.

4. The machine of claim 3, wherein the distribution means comprises a spray ball.

5. The machine of claim 1, comprising a first discharge pipe, a second discharge pipe and a third discharge pipe connected in series with each other, wherein the first discharge pipe is in fluid communication with the second outlet opening of the container with the discharge valve arranged between them.

6. The machine of claim 5, further comprising a filter arranged between the first discharge pipe and the second discharge pipe, and a discharge pump arranged between the second discharge pipe and the third discharge pipe, and wherein the third discharge pipe is in communication with the outside of the machine.

7. The machine of claim 6, wherein the third discharge pipe comprises a siphon.

8. The machine of claim 1, wherein the stirrer is rotatable about a horizontal axis of longitudinal extension of the container and the discharge valve comprises a tubular casing fixed to the container on the outside thereof and having an opening in fluid communication with the second outlet opening, a plunger movable inside the casing along a direction transverse to said longitudinal axis between an end-of-travel position for opening the second outlet opening and an end-of-travel position for closing the second outlet opening and a device for actuating the plunger.

9. The machine of claim 1 further comprising a device for injecting a detergent into the washing liquid, the device comprising a pump connected to a pipe for drawing off the detergent and to a detergent inlet pipe connected to the washing liquid inlet pipe.

10. The machine of claim 1 further comprising a device for injecting a rinse aid into the washing liquid, the device comprising a pump connected to a pipe for drawing off the rinse aid and to a rinse aid inlet pipe connected to the recirculation pipe.

11. A method for cleaning a machine according to claim 1, comprising:

a) subjecting the working container to a first washing cycle using a first quantity of a washing liquid for a first predetermined time period while keeping closed the discharge valve associated with the second outlet opening of said working container;
b) opening the discharge valve and discharging the washing liquid;
c) optionally subjecting the means for feeding the base mixture and the working container to a second washing cycle using a second quantity of washing liquid for a second predetermined time period while keeping open the discharge valve, the washing liquid being circulated inside the recirculating circuit by means of the recirculating pump;
d) stopping the recirculating pump and discharging the washing liquid, and
e) optionally repeating steps a) and b) and/or the steps c) and d) depending on a number of desired additional washing cycles.

12. The method of claim 11, wherein in step c) the washing liquid is heated by said heating means to a predetermined temperature and/or kept at this temperature, said temperature being optionally between 60° C. and 90° C.

13. The method of claim 11, wherein the first washing cycle according to step a) comprises the step of supplying the first quantity of the washing liquid into the means for feeding the base mixture into the container by means of the washing liquid inlet pipe and optionally the step of distributing the washing liquid supplied in the means for feeding the base mixture.

14. The method of claim 11, wherein the second washing cycle according to step c) comprises the step of supplying the second quantity of the washing liquid into the means for feeding the base mixture, into the container and into the discharge pipe by means of the washing liquid inlet pipe.

15. The method of claim 11, wherein the stirrer of the container is activated during the first washing cycle according to step a) and/or during the second washing cycle according to step c).

16. The method of claim 11, wherein the first quantity of washing liquid and the second quantity of washing liquid is between 2 liters and 16 liters.

17. The method of claim 11, wherein the second quantity of washing liquid is greater than the first quantity of washing liquid.

18. The method of claim 11, wherein the first washing cycle according to step a) and/or the second washing cycle according to step c) comprise(s) the step of supplying a detergent into the washing liquid and/or wherein the second washing cycle according to step c) comprises the step of supplying a rinse aid into the washing liquid.

19. The method according to claim 11, further comprising after step d) or after step e), where provided, the step of disassembling and cleaning the discharge valve.

\* \* \* \* \*